United States Patent
Walls et al.

(10) Patent No.: US 6,758,006 B1
(45) Date of Patent: Jul. 6, 2004

(54) FISHING INFORMATION DEVICE AND METHOD OF USING SAME

(75) Inventors: Peter L. Walls, 3490 Kohn Rd., Conover, WI (US) 54519; Scott L. Springer, Menomonie, WI (US); Richard Dreher, Wausau, WI (US)

(73) Assignee: Peter L. Walls, Conover, WI (US)

( * ) Notice: Subject to any disclaimer, the term of this patent is extended or adjusted under 35 U.S.C. 154(b) by 0 days.

(21) Appl. No.: 10/424,354

(22) Filed: Apr. 24, 2003

Related U.S. Application Data (63) Continuation of application No. 09/837,783, filed on Apr. 18, 2001, now Pat. No. 6,584,722.

(51) Int. Cl.[7] .............................................. A01K 97/00
(52) U.S. Cl. ..................... 43/4.5; 43/4; 43/25; 377/5; 700/91; 700/92
(58) Field of Search ............................ 43/1, 4, 4.5, 25; 377/5, 15; 700/91–93; 242/223

(56) References Cited

U.S. PATENT DOCUMENTS

| | | | | |
|---|---|---|---|---|
| 4,222,563 A | * | 9/1980 | Heftler et al. ................. 377/5 |
| 4,261,528 A | * | 4/1981 | McKinney ................. 242/323 |
| 4,445,178 A | * | 4/1984 | Scheer et al. .................... 43/4 |
| 4,634,072 A | * | 1/1987 | Stealy ........................ 242/223 |
| 4,697,758 A | * | 10/1987 | Hirose et al. ............... 242/223 |
| 5,084,695 A | * | 1/1992 | Freeman ........................ 377/5 |
| 5,232,223 A | * | 8/1993 | Dornbusch ..................... 43/4 |
| 5,259,252 A | * | 11/1993 | Kruse et al. ................... 43/17 |
| 5,294,913 A | * | 3/1994 | Mower et al. ................. 377/5 |
| 5,345,691 A | * | 9/1994 | Falk et al. .................. 242/223 |
| 5,418,517 A | * | 5/1995 | Matherne et al. ............. 377/5 |
| 5,446,775 A | * | 8/1995 | Wright et al. .................. 377/5 |
| 5,485,646 A | * | 1/1996 | Merritt ........................ 377/15 |
| 5,542,672 A | * | 8/1996 | Meredith ......................... 43/4 |
| 5,730,655 A | * | 3/1998 | Meredith ......................... 43/4 |
| 5,757,731 A | * | 5/1998 | Rosenberg .................. 368/223 |
| 5,782,033 A | * | 7/1998 | Park et al. ....................... 43/4 |
| D402,574 S | * | 12/1998 | O'Malley .................... D10/97 |
| 5,855,516 A | * | 1/1999 | Eiba ............................. 700/91 |
| 6,012,995 A | * | 1/2000 | Martin ........................ 700/92 |
| 6,030,109 A | * | 2/2000 | Lobsenz ...................... 700/92 |
| 6,053,823 A | * | 4/2000 | Mathews ..................... 700/91 |
| 6,253,461 B1 | * | 7/2001 | Fischer ....................... 242/223 |
| 6,312,335 B1 | * | 11/2001 | Tosaki et al. ........... 273/148 B |
| 6,584,722 B1 | * | 7/2003 | Walls et al. ..................... 43/4 |
| 6,587,740 B2 | * | 7/2003 | Byrne et al. .................. 43/4.5 |

FOREIGN PATENT DOCUMENTS

| | | | |
|---|---|---|---|
| JP | 8-140545 B1 | * | 6/1996 |
| JP | 2000-262199 B1 | * | 9/2000 |

OTHER PUBLICATIONS

Flip Pitch N' Cast Competition. (2000–2002). Open Competition Rules 2003. Available web site: www.flippitchcast-.com/rules.htm Accessed on: Oct. 7, 2003.*

Jerry Drazer. Tournament Etiquette Unwritten rules of the game. Available web site: www.kicknbass.com/tournament_etiquette.htm Accessed on: Oct. 7, 2003.*

* cited by examiner

*Primary Examiner*—Darren W. Ark
(74) *Attorney, Agent, or Firm*—Tipton L. Randall (57) ABSTRACT

An electronic fishing information recording and storage device is disclosed. The device attaches to a traditional fishing rod and reel assembly and automatically records the number of casts executed with the subject rod and reel. For each fish caught, the device is capable of recording relevant information about the type of fish and weather conditions at the time of catch. Means are provided for transfer of fishing information to a traditional personal computer. The device provides a method for tournament fishing wherein the allotted time for each contestant to fish can be replaced by the number of casts allotted.

12 Claims, 7 Drawing Sheets

Velocity shown
As curved vector

At position 5, velocity changes rapidly from a high numeric value toward right to either zero or reversing to the left. This acceleration is what is detected by sensor.

Figure 6

Figure 7
ELECTRONIC FUNCTIONAL DIAGRAM

FISHING INFORMATION DEVICE AND METHOD OF USING SAME

This application is a continuation of U.S. patent application Ser. No. 09/837,783, filed Apr. 18, 2001, now U.S. Pat. No. 6,584,722 which is hereby incorporated by reference.

Not applicable.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a device for obtaining fishing information, and more particularly, to a device for tracking the number of casts made by a fisherman, and recording other pertinent information related to fishing conditions.

2. Background Information

The subject matter of this invention is directed primarily to a fishing information device for attachment to a fishing rod and reel combination. Fishermen often keep track of location, weather conditions, time of day, etc. when a fish is caught. This data can be useful in predicting when and where fish might be caught in the future. Fishing guides, who make a living by assisting anglers in catching fish, often keep detailed notes or journals as to the best time, location and conditions to maximize the chances of catching fish. Recreational fishermen often rely on their memory for such details, and can easily forget the particular details that may lead to a good catch of fish.

In response to the need for accurate recording of fishing details, applicants have invented a fishing information device for tracking the number of casts made by a fisherman, and recording other pertinent information related to fishing conditions.

SUMMARY OF THE INVENTION

The invention is a fishing information device that records the number of casts executed with a given fishing rod and reel, the time and/or day a fish was caught, the weather conditions at the time a fish was caught, the type of fish caught, or any other information relating to the activity of fishing by rod and reel methods. The fishing information device attaches to a fishing rod and reel combination and includes an electronic module reversibly fastenable to the fishing rod and reel combination. The fishing information device module includes an information display means for displaying fishing activity information, a microcontroller means, with power supply and clock, for execution of a predetermined sequence of information handling events, and push button means for operator input of data to the microcontroller. The microcontroller means provides a series of signals to the display means, the signals indicating fishing activity information. The microcontroller means also stores fishing activity information in response to operator interaction with the push button means. Sensor means for signaling the microcontroller means upon the operator making a cast with the rod and reel combination is also present.

The electronic module is adapted for recording the cumulative number of casts made with the rod and reel combination, and other pertinent fishing information. A sensor assembly is fastened to the rod and reel combination, with the sensor assembly in electrical communication with the electronic module. The sensor assembly signals the electronic module each time a cast is made with the rod and reel combination.

One application of the fishing information device disclosed herein is to conduct fishing tournaments under new and unique guidelines. Traditionally fishing tournaments provide contestants a certain time restriction during which they may attempt to catch fish for consideration toward the best catch prizes. With the device of the present invention, tournaments can be held with a restriction on the total number of casts executed in place of, or in addition to, the traditional time on water restriction.

DESCRIPTION OF THE PREFERRED EMBODIMENTS

Figure 1:
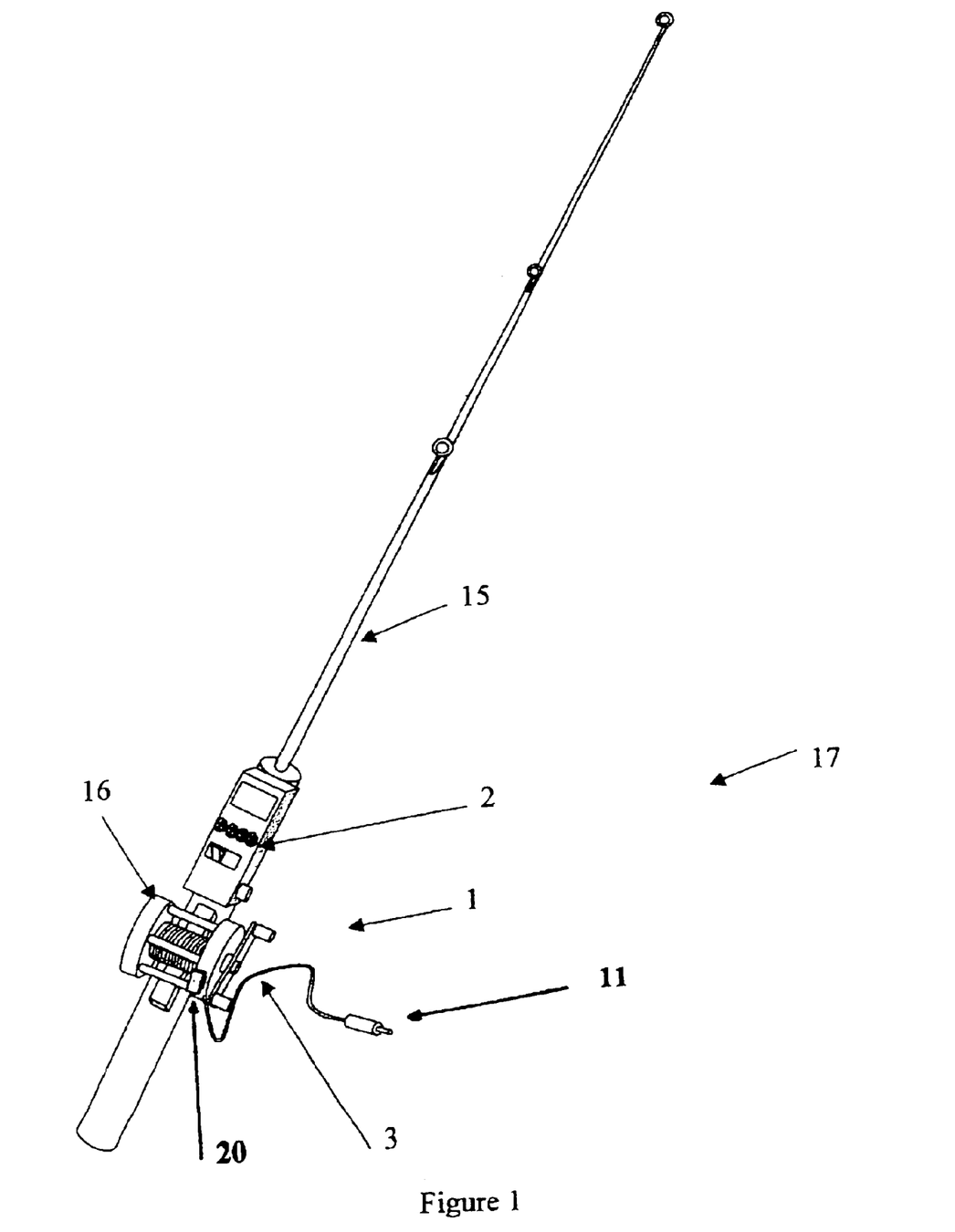
FIG. 1 is a perspective view of one embodiment of the device of the present invention installed on a rod and reel combination.
Figure 2:
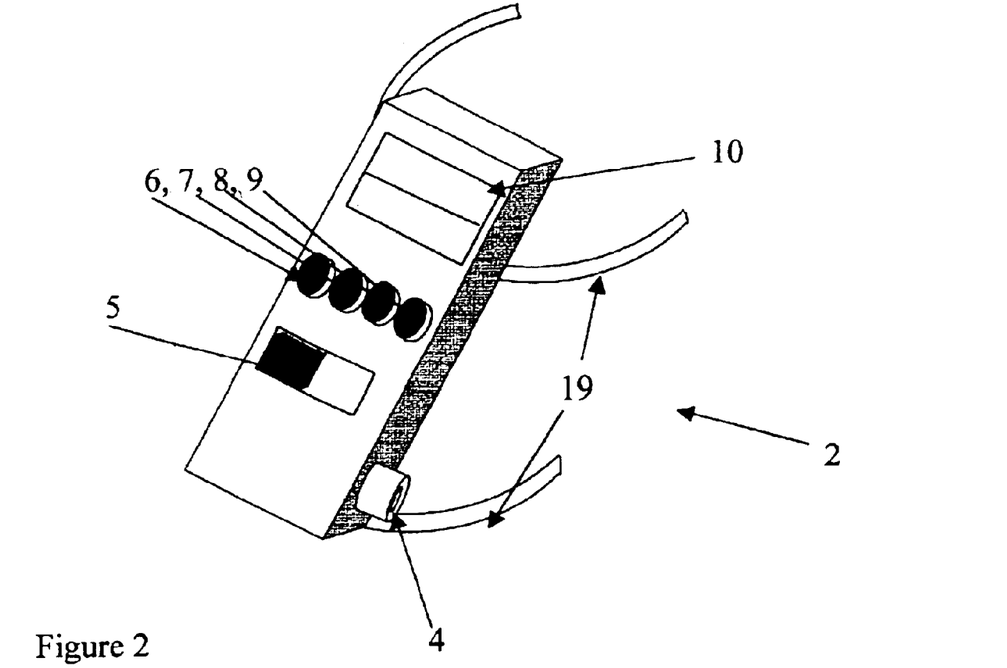
FIG. 2 is a perspective view of the electronic module of the device of the present invention.
Figure 3:
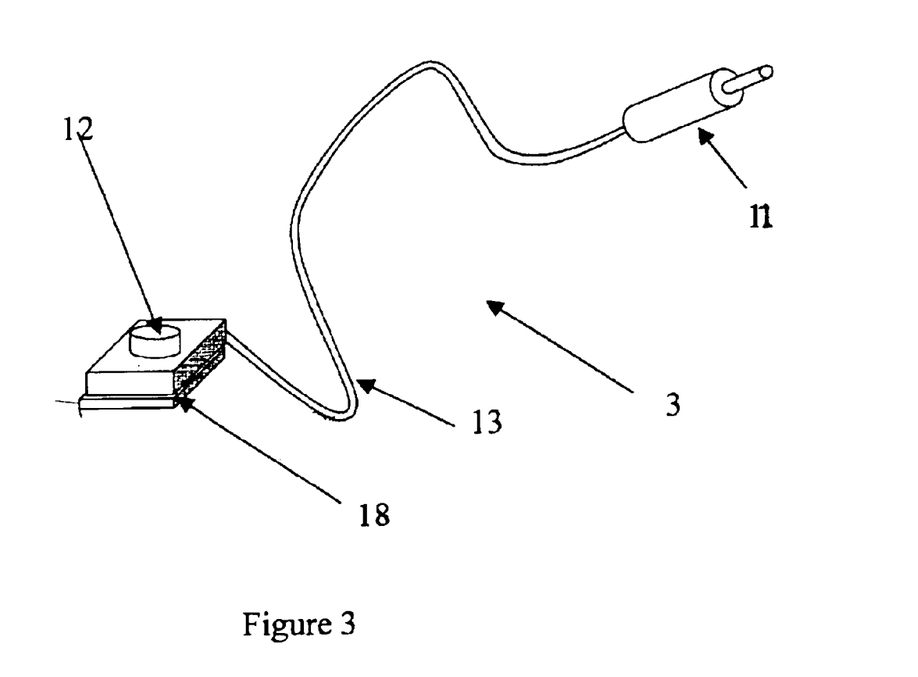
FIG. 3 is a perspective view of the push button assembly of the device of the present invention.

Nomenclature
1 Fishing Information Device
2 Electronic Module
3 Push Button Assembly
4 Female Electrical Receptacle
5 ON/OFF Slide Switch
6 Menu Switch
7 Scroll Switch
8 Accept Data Switch
9 Display Backlight Switch
10 Display Unit
11 Male Electrical Plug
12 Counter Push Button
13 Electrical Conductor Wire
14 Acceleration Sensor Member
15 Fishing Rod
16 Casting Reel
17 Rod and Reel Combination
18 Contact Adhesive 19 Hook and Loop Fasteners
20 Spool Release Button
21 Line Spool of Reel
22 Spool Housing
23 Data Port
24 Electrical Conductor Wire
25 Personal Computer
30 Mass of Acceleration Sensor
31 Flexible Beam
32 Contact Block
33 Electrical Conductor
34 Electrical Conductor
35 Frame of Acceleration Sensor Construction Referring to FIG. 1, a preferred embodiment of the fishing information device 1, as installed on a typical fishing rod and reel combination 17 is illustrated. Electronic module 2 is reversibly attached to the upper handle section of fishing rod 15, by hook and loop fasteners 19, as shown in FIG. 2. A push button assembly 3 is attached atop a conventional fishing reel spool release push button 20 by adhesive 18, best shown in FIG. 3. The push button assembly 3 includes a conductor wire 13 with a male connector plug 11 that transmits an electrical signal from the push button 12 to the electronic module 2 with the connector plug 11 inserted into the female electrical receptacle 4 of the module 2. The male connector plug 11 is readily attached to and detached from the female receptacle 4, allowing one push button assembly 3 to remain permanently attached to one reel 16 while allowing the electronic module 2 to be used with multiple rod and reel combinations 17, each reel fitted with a dedicated push button assembly 3. Thus, a single electronic module 2 may be used in conjunction with a plurality of push button assemblies 3, with each push button assembly 3 being permanently attached to a fishing reel 16.

Figure 7:
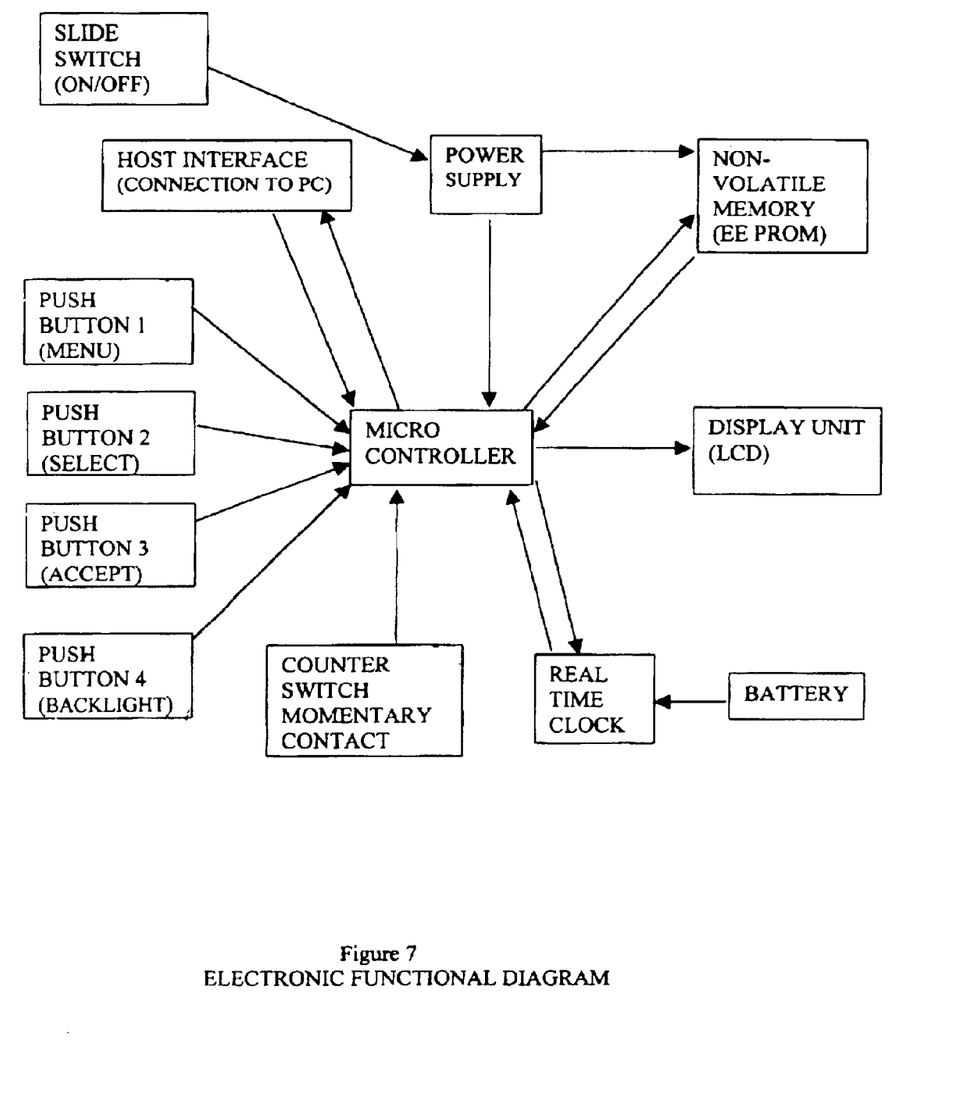
FIG. 7 is a schematic block representation of the electronic system used in the device of the present invention.
Figure 8:
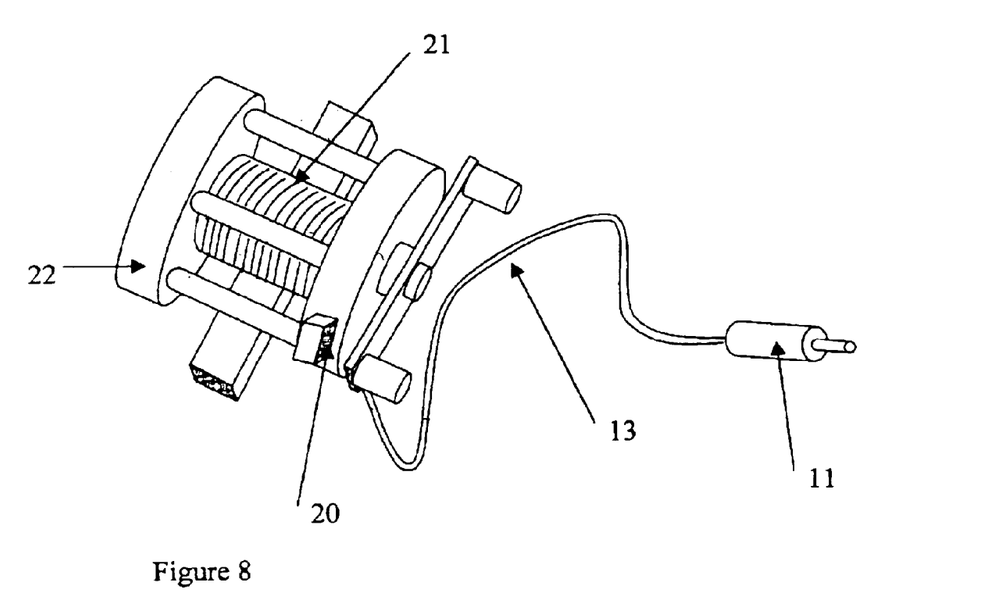
FIG. 8 is a perspective view of an alternative electrical contact closure assembly of the present invention.

An alternative embodiment of the push button assembly 3 of the invention is shown in FIG. 8. An alternative electrical contact closure is employed in place of the cast count push button 12 of the push button assembly 3. The electrical contact closure is mounted internal to the fishing reel 16. In this embodiment, depression of the traditional spool release button 20 activates an electrical contact closure signal, which is in turn transferred to the electronic module 2 though conductor wire 13 and male connector 11, which is engaged with the female connector 4 on the electronic module 2. The internal electric contact closure can be realized either by a traditional electric switch, mechanically coupled to the spool release 20, or by an electrical contact closure that results from relative motion between the spool release 20 and the traditional spool housing 22. The information handling that results from the cast counting electrical contact closure remains the same as in the other embodiments, as described under the block diagram description of FIG. 7.

Figure 10:
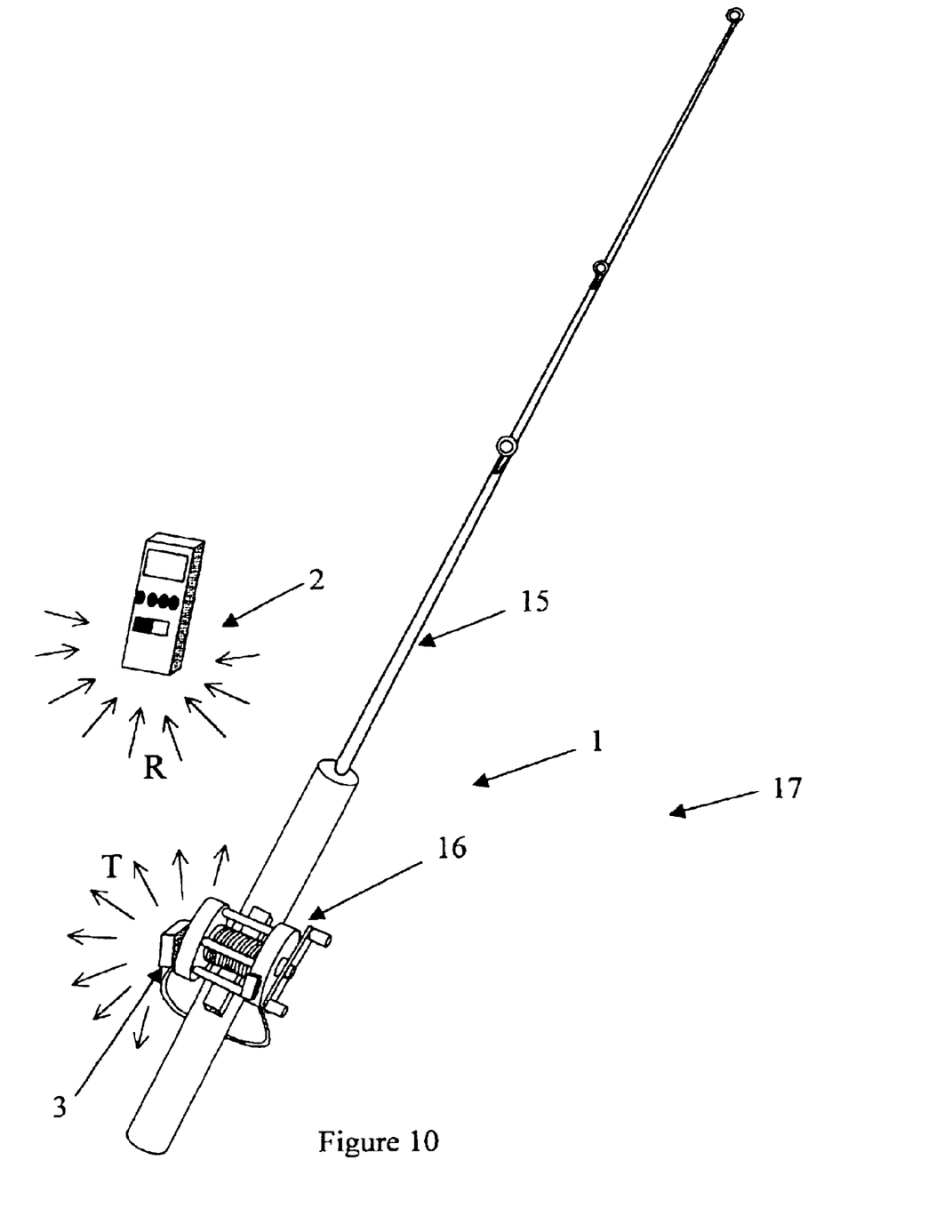
FIG. 10 is a perspective view of an alternative embodiment of the device of the present invention installed on a rod and reel combination.

In another alternative embodiment of the invention, the cast sensor (analogous to the cast count push button 12) transmits a signal indicating a cast has take place, to be received by the electronic module 2 via a wireless connection, as depicted in FIG. 10. The wireless transmission may be accomplished by any known transmission technology, such as radio frequency (rf), infrared beam (ir), etc. If a wireless connection is used, it may be advantageous to locate the electronic module 2 apart from the rod and reel combination 17, yet in close proximity to the reel 16. In this embodiment, a wireless connection defines attachment of the electronic module 2 to the rod and reel combination 17. For example, if a wireless connection, attachment or operative connection, is employed, the electronic module may be mounted in the fisherman's boat or attached to a belt worn by the fisherman. Alternatively, if preferred, the electronic module may be incorporated with other commonly used electronic fishing devices, such as a depth indicator/fish locator or a global positioning system (GPS). Again, the information handling that results from the cast counting wireless electronic signal remains the same as in the other embodiments, as described under the block diagram description of FIG. 7.

Figure 6:
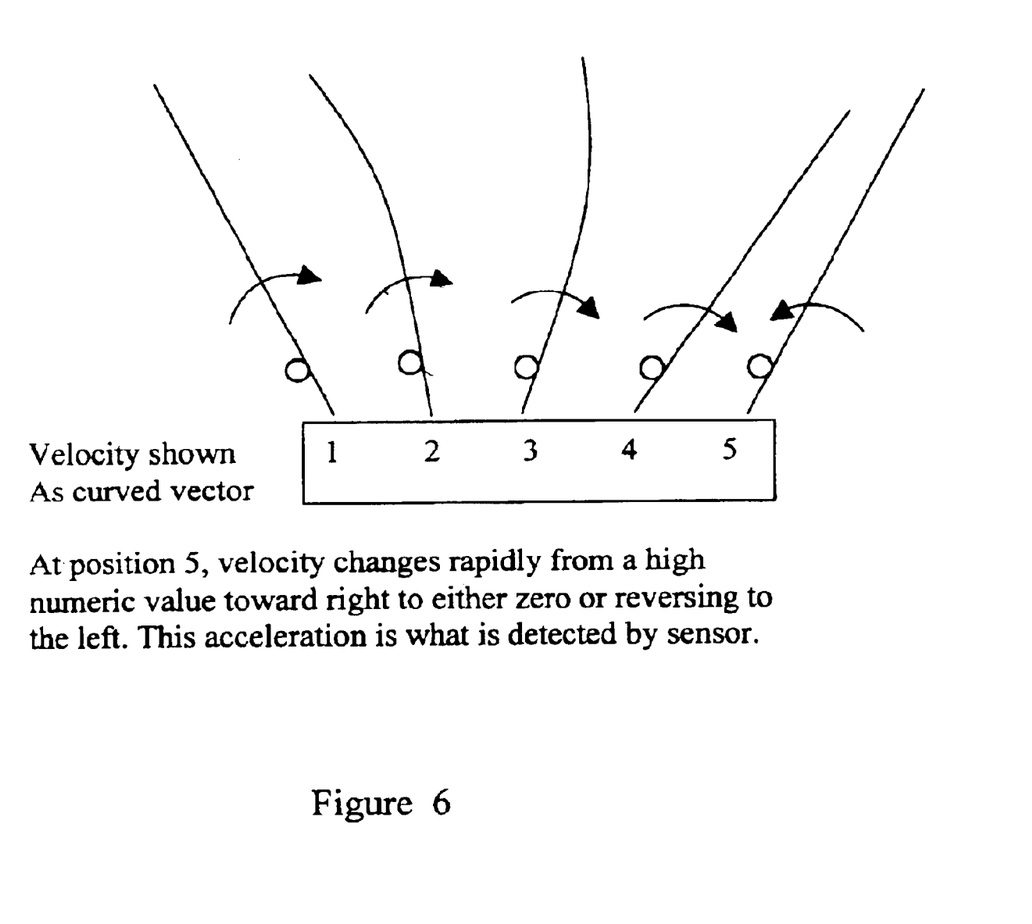
FIG. 6 is a schematic representation of the various stages of a typical casting cycle with a rod and reel combination.

The general operation of the cast counting feature of the preferred embodiment of the invention with the push button 12 on the spool release button 20 is as follows. Upon preparing to make a cast, the operator depresses push button 12 which closes electrical contacts, not shown but included internal to the traditional push button 12. In addition to closing electrical contacts, depression of the push button 12, which is attached to traditional spool release button 20 of traditional fishing reel 16, releases the spool 21, permitting a traditional casting cycle, as depicted in FIG. 6. A traditional casting cycle includes pushing spool release button 20 while the rod is in the horizontal position, raising the rod and reel combination to an inclined preparatory position, while prohibiting spool rotation, either by manually holding the spool on some fishing reels or by maintaining pressure on the spool release button 20 on other fishing reel designs. From the preparatory position, shown in FIG. 6-1, the operator rapidly rotates the rod and reel forward sequentially through positions generally depicted in FIGS. 6-1, 6-2, 6-3, 6-4, and 6-5. The rod and reel motion is rapid and continuous in the rightward direction shown in FIG. 6, until position 6-5, wherein the operator releases the spool 21 and abruptly stops rightward motion of the fishing rod 15. Often this motion stopping results in a velocity leftward, as indicated by the curved line in FIG. 6-5. In the preferred embodiment, upon each depression of the electric push button 12, the electronic module 2 counts an incremental additional cast, as described in more detail under the block diagram description of FIG. 7.

Figure 4:
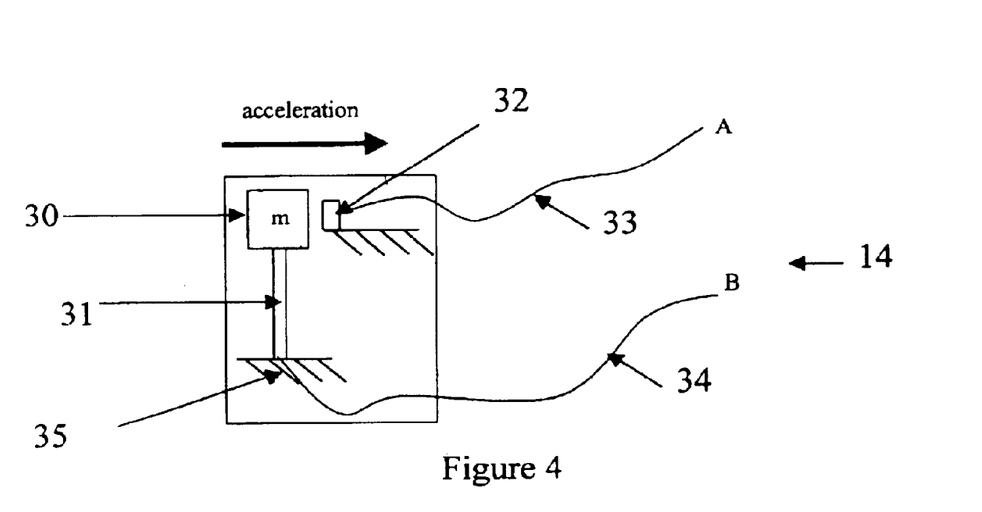
FIG. 4 is a schematic view of an alternative acceleration sensor assembly of the device of the present invention.
Figure 5:
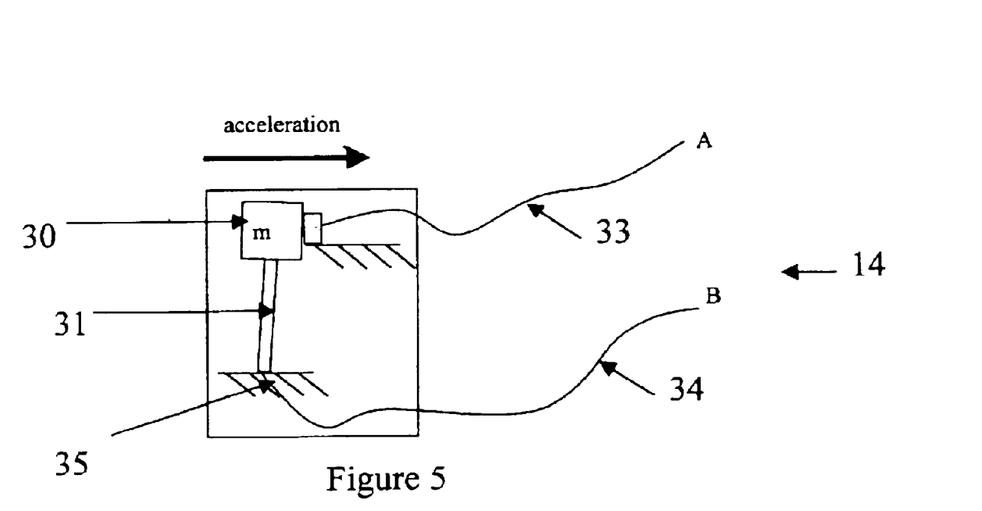
FIG. 5 is another schematic view of the alternative acceleration sensor assembly of the device of the present invention.

In yet another alternative embodiment, the cast count push button 12 is replaced with an internal acceleration sensor 14. The electronic module 2 is thus connected to the internal acceleration sensor 14 that is used to sense when a cast has occurred, in place of the count push button 12. The acceleration sensor 14 is capable of sensing the change in velocity that occurs at the end of the typical casting cycle shown in FIG. 6. In particular, the rapid change in velocity magnitude between cast stages shown in FIGS. 6-4 and 6-5 is detected as a cast indication signal. A typical acceleration sensor 14 is illustrated in FIG. 4 and FIG. 5. While the schematic representation of the acceleration sensor 14 exemplifies the general operation of one design of an acceleration sensor, it is well within the scope of the present invention to utilize any variation or design of acceleration sensors for the purpose of indicating that a cast has taken place, and using this information for recording and retrieval as described in the block diagram description of FIG. 7 that follows.

Referring to FIG. 4, the acceleration sensor 14 is shown schematically as a mass 30, rigidly attached to a flexible beam 31, which in turn is rigidly connected to frame 35. The acceleration sensor 14 also includes a contact block 32 attached to an electrical wire 33, and an electrical wire 34 connected to mass 30 for the purpose of providing a change in electrical signal. As shown in FIG. 5, upon a rapid change in velocity, the mass 30 comes in contact with the contact block 32, resulting in a closed contact electrical state between wires 33 and 34. This signal is used in the alternative embodiment in place of the push button 12, described in the preferred embodiment. The acceleration magnitude at which the electrical signal changes state from an open contact to a closed contact is determined by the specific sizes of the components of the acceleration sensor 14, such as the mass of element 30 and the dimensions of the beam 31. Alternatively, the acceleration sensor 14 may be attached to the rod 15 or to the reel 16 at any unobtrusive location that avoids obstruction by the sensor 14 when using the rod and reel combination 17.

Figure 9:
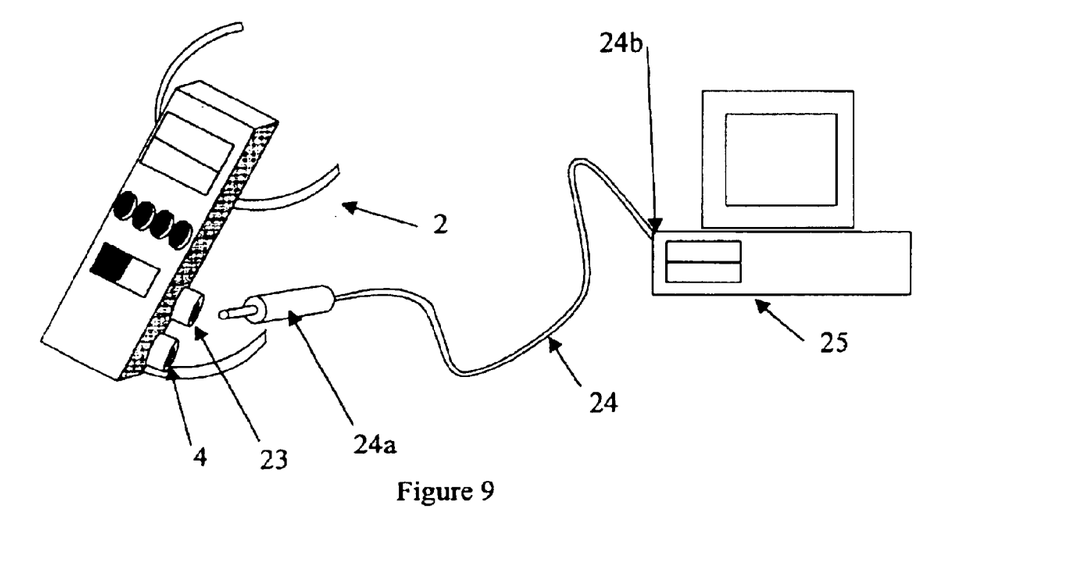
FIG. 9 is a perspective view of the electronic module of the device of the present invention connected to a computer for downloading data

In yet another embodiment of the invention, the electronic module 2 is adapted to provide data transfer to a traditional personal computer 25. In this embodiment, the electronic module 2 is provided with a data port 23 as shown in FIG. 9. The data port 23 is adapted to receive a connecting cable 24 by a connector 24a located on the proximal end of cable 24. The distal end of cable 24, denoted as 24b, is adapted to connect to a traditional RS-232 serial port of the traditional personal computer 25, providing data transfer via traditional serial communication protocol, which is well known by those skilled in the art. It would be possible, if desired, to use alternative data transfer technologies such as USB, parallel, infrared, and/or other wireless technologies in place of standard RS-232 serial connection. The data transfer from the electronic module 2 to the personal computer 25 is provided to permit the fishing information that has been stored during fishing outings to be transferred to the personal computer 25 for subsequent storage, manipulation and/or display. Thus, the subject device 1 provides a convenient method for collection of fishing data that allows for easy transfer of data to a standard personal computer 25 offering a wide range of data manipulation options.

The block diagram of FIG. 7 provides a visual depiction of the electronic system used in the fishing information device 1. All function block items shown in FIG. 7, with the exception of the counter switch 12 or acceleration sensor 14, are physically located within the electronic module 2. All electronic information storage and user display functions are provided by the electronic means described below. The general design of the electronic means is to provide a microcontroller integrated circuit, along with computer software (or a set of instructions) to execute the desired functions as described herein. Additional functional components that interact with the microcontroller in the preferred embodiment are described below. Those skilled in the art of electronic system design and specification would be able to utilize the block diagram description to duplicate the electronic functions and means described herein.

Referring again to FIG. 2, a slide switch 5 is provided to enable the operator to turn on and off the major power consuming devices of the electronic system. The power supply consists of an energy storage device: i.e., a battery coupled to a DC-DC converter as is well known to those skilled in the art. This arrangement provides a steady voltage to the nonvolatile memory, microcontroller and display unit, even though the voltage present at the battery terminals will drop as the energy level of the batteries is depleted during normal use. The nonvolatile memory is provided in the form of an EEPROM integrated circuit, as is well known to those skilled in the art. The nonvolatile memory serves the purpose of storing information while the slide switch 5 is turned to the off position, during the unit's storage or to replace the batteries. The nonvolatile memory in the preferred embodiment stores the computer software program, as well as the data acquired while the device is in use. The display unit 10 provided in the preferred embodiment is a 2 line by 8 character liquid crystal display module, permitting programmable direct access to the standard typeface characters via ASCII codes, as is commercially available and well known to those skilled in the art.

The computer processor utilized in the preferred embodiment is a Motorola MC68HC908GP32 eight bit microcontroller unit (MCU), which is used to execute the computer software necessary to implement the described functions. Because the device maintains date and time data that remain active even when the slide switch 5 is in the off position, such as when the unit is in storage, a real time clock with a backup battery is included in the electronic functional diagram. As is well known to those skilled in the art, this device is interconnected with the microcontroller to provide the date and time information when required by the computer software that executes within the microcontroller while the unit is in use. In the preferred embodiment, the counter switch block of the diagram indicates a normally open momentary contact electrical switch that is operatively connected to the fishing reel, thus providing a momentary change of state each time the spool 21 is released on the reel 16. A change of state of the switch is recognized by the software on the microcontroller, indicating that cast has taken place. In an alternate embodiment, the counter switch block is implemented by one or more acceleration sensors 14.

Referring again to FIG. 2, a push button 9 is a momentary contact switch and is provided as a means to illuminate a back light on the display unit 10 of the preferred embodiment, thus permitting easy viewing of the display 10 in low light situations. Push button 8 is a momentary contact switch and is provided as a means for the operator to indicate acceptance of the input fishing data that is currently being displayed. Push button 7 is a momentary contact switch and is provided as a means for the operator to scroll through predetermined data selections that represent fishing events. Push button 6 is a momentary contact switch and is provided as a means for the operator to initiate a menu selection sequence. Each successive depression of push button 6 changes the display from mode n display to mode (n+1) display. Thus, the first depression of push button 6 changes the display from mode 1 to mode 2 and the second depression of push button 6 changes the display from mode 2 to mode 3. For example if the operator had just caught a walleye pike, under a partly cloudy weather condition on his 15th cast, he would execute the following push button sequence to record that information along with the time and the date of his catch, in the nonvolatile memory. First he would press push button 6 (menu) to change the display from mode 1, a display of short term number of casts in the upper portion and total number of casts in the lower portion, to mode 2. Mode 2 displays the heading FISH: in the upper portion and the name of last selected fish species (e.g., Muskie) from a predetermined list of fish species in the lower portion of the display unit. The operator would then press push button 7 (select) to change the lower display from the current fish species to the next predetermined fish species (e.g., Northern). Another depression of push button 7 would result in the lower display changing to the next predetermined fish species (e.g., Walleye). The operator would then press push button 8 (accept) to enter the currently displayed fish. The operator would then again press push button 6 (menu) to advance the display to mode 3, which results in an upper display of the heading WEATHER: and the lower display of the last selected weather condition (e.g., sunny) from a predetermined list of weather descriptions. Next the operator depresses push button 7 (select) to advance the weather condition to the next predetermined representation (e.g., clear). Again the operator presses push button 7 and the lower display advances to the next predetermined weather condition (e.g., partcldy). Because this weather condition selection accurately represents the condition under which the fish was caught, the operator presses push button 8 (accept) to accept the currently displayed weather condition. The operator would then again press push button 6 (menu) to advance the display to mode 4, which results in an upper display of the heading SAVE: and the lower display of the word Catch. The operator would then press push button 8 (accept), to enter into the database that a walleye had been caught on a partly cloudy day on short term cast number 15.

It may be deemed advantageous in some applications of the present invention to record additional information regarding the fishing activity, such as the lure or bait used, fish length, fish weight, fish sightings, water depth, water temperature, etc. It is well within the scope of the present invention to modify the information content to be recorded to include any fishing related information or data.

In a further embodiment of the invention, the fishing information device 1 is employed by contestants in a fishing tournament. At present, fishing tournament contestants are given a set period of time during a day to catch fish, with the tournament lasting one to three days. By use of the fishing information device 1 of the present invention, a unique method for a fishing tournament is available. The method for conducting a fishing tournament includes providing contestants with rod and reel combinations having a fishing information device attached thereto. The fishing information device includes an electronic module reversibly fastenable to the fishing rod and reel combination, with the module adapted for recording the cumulative number of casts made with the rod and reel combination, and a sensor assembly fastened to the rod and reel combination, the sensor assembly in electrical communication with the electronic module, with the sensor assembly signaling the electronic module each time a cast is made with the rod and reel combination.

At the outset of the tournament, a limit to the number of casts a contestant may take with the rod and reel combination during the tournament is selected. The tournament judges monitoring the number of casts taken by each contestant during the tournament, and award prizes to contestants based upon the fish caught with the limited number of casts taken. Alternate prize categories could also be established based on the numbers of casts executed. For example, a prize category might be for the fish caught in a minimum number of casts (first fish), or for a quantity of fish caught with a minimum number of casts.

While the invention has been particularly shown and described with reference to preferred embodiments thereof, it will be understood by those skilled in the art that various changes in form and details may be made therein without departing from the spirit and scope of the invention.

We claim:

1. A method for conducting a fishing tournament comprising:
   (a) providing means operatively connected to each contestant's fishing rod and reel combination for recording the cumulative number of casts made by each tournament contestant with the rod and reel combination;
   (b) monitoring the number of casts taken by each contestant with the rod and reel combination during the tournament; and
   (c) awarding prizes to contestants based upon fish caught and the number of casts taken with the rod and reel combination.

2. The method for conducting a fishing tournament of claim 1 wherein, the means for recording the cumulative number of casts made by each tournament contestant comprises a fishing information recording and storage device including:
   (i) an electronics module operatively connected to the fishing rod and reel combination, the module adapted for recording the cumulative number of casts made with the rod and reel combination; and
   (ii) a sensor assembly fastened to the rod and reel combination, the sensor assembly in communication with the electronics module, the sensor assembly signaling the electronics module upon a contestant making a cast with the rod and reel combination.

3. The method for conducting a fishing tournament of claim 2 wherein, the sensor assembly includes an electrical switch member activated by depressing a spool release button of the fishing reel to produce a signal indicating a cast, and an electrical conductor between the switch member and the electronics module.

4. The method for conducting a fishing tournament of claim 2 wherein, the sensor assembly includes an acceleration sensor secured to the rod and reel combination, and an electrical conductor between the acceleration sensor and the electronics module.

5. The method for conducting a fishing tournament of claim 2 wherein, the sensor assembly and electronics module includes means for wireless communication between the sensor assembly and the electronics module.

6. The method for conducting a fishing tournament of claim 5 wherein, the electronics module is positioned in proximity to the fishing rod and reel combination.

7. A method for conducting a fishing tournament comprising:
   (a) providing means operatively connected to each contestant's fishing rod and reel combination for recording the cumulative number of casts made by each tournament contestant with the rod and reel combination;
   (b) selecting a limit to the number of casts a contestant may take with the rod and reel combination during the tournament;
   (c) monitoring the number of casts taken by each contestant with the rod and reel combination during the tournament; and
   (d) awarding prizes to contestants based upon fish caught with the limited number of casts taken with the rod and reel combination.

8. The method for conducting a fishing tournament of claim 7 wherein, the means for recording the cumulative number of casts made by each tournament contestant comprises a fishing information recording and storage device including:
   (i) an electronics module operatively connected to the fishing rod and reel combination, the module adapted for recording the cumulative number of casts made with the rod and reel combination; and
   (ii) a sensor assembly fastened to the rod and reel combination, the sensor assembly in communication with the electronics module, the sensor assembly signaling the electronics module upon a contestant making a cast with the rod and reel combination.

9. The method for conducting a fishing tournament of claim 8 wherein, the sensor assembly includes an electrical switch member activated by depressing a spool release button of the fishing reel to produce a signal indicating a cast, and an electrical conductor between the switch member and the electronics module.

10. The method for conducting a fishing tournament of claim 8 wherein, the sensor assembly includes an acceleration sensor secured to the rod and reel combination, and an electrical conductor between the acceleration sensor and the electronics module.

11. The method for conducting a fishing tournament of claim 8 wherein, the sensor assembly and electronics module includes means for wireless communication between the sensor assembly and the electronics module.

12. The method for conducting a fishing tournament of claim 11 wherein, the electronics module is positioned in proximity to the fishing rod and reel combination.

* * * * *